US008656009B2

(12) United States Patent
Suit

(10) Patent No.: US 8,656,009 B2
(45) Date of Patent: Feb. 18, 2014

(54) INDICATING AN IMPACT OF A CHANGE IN STATE OF A NODE

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 270 days.

(21) Appl. No.: 12/905,761

(22) Filed: Oct. 15, 2010

(65) Prior Publication Data

US 2012/0096143 A1    Apr. 19, 2012

(51) Int. Cl.
*G06F 15/173*    (2006.01)
*G06F 15/16*    (2006.01)

(52) U.S. Cl.
USPC ............ 709/224; 709/223; 709/244; 709/249

(58) Field of Classification Search
USPC .................................................. 709/223, 224
See application file for complete search history.

(56) References Cited

U.S. PATENT DOCUMENTS

| | | | |
|---|---|---|---|
| 6,513,059 B1 | 1/2003 | Gupta et al. | |
| 6,658,465 B1 | 12/2003 | Touboul | |
| 6,871,223 B2 | 3/2005 | Drees | |
| 7,624,172 B1 * | 11/2009 | Austin-Lane | 709/224 |
| 7,769,720 B2 | 8/2010 | Armington | |
| 7,793,162 B2 | 9/2010 | Mock et al. | |
| 7,890,318 B2 | 2/2011 | Castellani et al. | |
| 8,156,378 B1 | 4/2012 | Suit | |
| 8,185,442 B2 | 5/2012 | Vedula | |
| 2003/0225876 A1 * | 12/2003 | Oliver et al. | 709/224 |
| 2004/0133672 A1 | 7/2004 | Bhattacharya | |
| 2005/0044206 A1 * | 2/2005 | Johansson et al. | 709/224 |
| 2005/0240606 A1 | 10/2005 | Edelstein | |
| 2005/0268298 A1 | 12/2005 | Hunt et al. | |
| 2006/0069768 A1 * | 3/2006 | Wen et al. | 709/224 |
| 2006/0074833 A1 | 4/2006 | Gardner | |
| 2006/0195715 A1 | 8/2006 | Herington | |
| 2006/0230134 A1 * | 10/2006 | Qian et al. | 709/224 |
| 2007/0061382 A1 * | 3/2007 | Davis et al. | 707/201 |
| 2007/0220121 A1 | 9/2007 | Suwarna | |
| 2008/0126856 A1 * | 5/2008 | Levidow et al. | 714/19 |
| 2009/0028053 A1 | 1/2009 | Kannan | |
| 2009/0182880 A1 | 7/2009 | Inamdar | |
| 2009/0204701 A1 * | 8/2009 | Herzog et al. | 709/224 |
| 2009/0228579 A1 * | 9/2009 | Sanghvi et al. | 709/224 |
| 2009/0228589 A1 | 9/2009 | Korupolu | |
| 2009/0307772 A1 | 12/2009 | Markham et al. | |
| 2010/0049731 A1 | 2/2010 | Kiran Vedula | |

(Continued)

OTHER PUBLICATIONS

Office Action for U.S. Appl. No. 12/905,565, mailed Oct. 12, 2012.

(Continued)

*Primary Examiner* — Yemane Mesfin
*Assistant Examiner* — Peter Chen
(74) *Attorney, Agent, or Firm* — Lowenstein Sandler LLP

(57) ABSTRACT

A primary application comprising one or more executables is defined, and a network ontology for the primary application is determined and stored in a database, where the network ontology comprises one or more nodes of an enterprise network that communicate during execution of the one or more executables. Next, a change of state for at least one of the nodes is detected and used to determine one or more elements of the network ontology for the primary application that have a changed state. Further, an impact summary view is generated to indicate the elements of the primary application that have a changed state, and the impact summary view is displayed to a user.

20 Claims, 12 Drawing Sheets

(56) References Cited

U.S. PATENT DOCUMENTS

| | | |
|---|---|---|
| 2010/0138390 A1 | 6/2010 | Lobo |
| 2010/0161604 A1 | 6/2010 | Mintz et al. |
| 2010/0318609 A1 | 12/2010 | Lahiri et al. |
| 2012/0096065 A1 | 4/2012 | Suit |
| 2012/0096134 A1 | 4/2012 | Suit |
| 2012/0096142 A1 | 4/2012 | Suit |
| 2012/0096171 A1 | 4/2012 | Suit |
| 2012/0221898 A1 | 8/2012 | Suit |

OTHER PUBLICATIONS

Office Action for U.S. Appl. No. 12/905,645, mailed Sep. 13, 2012.
Office Action for U.S. Appl. No. 12/905,688, mailed Oct. 4, 2012.
Office Action for U.S. Appl. No. 12/905,879, mailed Jul. 8, 2011.
Notice of Allowance for U.S. Appl. No. 12/905,879, mailed Dec. 8, 2011.
Office Action for U.S. Appl. No. 13/439,803, mailed Aug. 31, 2012.

* cited by examiner

FIG. 9

Virtual Machine Summary — 80

Health — 81
- Alarms Count: 0
- VH State: Online
- Agent State: Offline (07/29/2009 12:16 EDT)

Properties — 82
- Type: Template VM
- Operating System: Microsoft Windows XP Professional (32-bit) [Unconfirmed]
- Version:
- Patch Version:
- CPUs: Intel(R) Xeon(R) CPU x3363 @ 2.83GHz
- Price: $750.00
- Tags: 0

Security
- Groups: 14
- Users: 2

Configuration
- Applications: 5 (Show current processes) — 84
- Customers: 1
- Kernel Modules/Drivers: 161
- Network Configuration: 2
- Resource Allocation: 3 — 83
- Services: 91
- Snapshots: 0

Relationships
- Baseline: Approved DEV-QA

Impact Summary View — 85
VM: WXP32bit_fse_4025 (WXP32bit_fse_4025)

Status — 86
- ◇ CPU
- ● Memory

Status Messages
- CPU is at a Critical High threshold of 100%
- Memory is at a Normal threshold of 21% — 87

Primary Applications affected — 89
- SQL
- SAP
- Exchange

Migration Candidates
- Impacted Dependencies of SQL TEAM Business Application Service Group by WXP32bit_fse_4025 — 88
- NAMAIN1 (storage)
- Application (Network Device)
- DB-Farm (Network Device)
- 10.173.0.33 (Physical HOST)

Application Owners
- SQL TEAM

Relationships

Zoom: -8 ........ 8

Choose layout... | Toggle Labels has DataStore — NAMan1
has ServiceGroup — SQL Team
has User — SQL team
has Network — Applications
belongs to Host — 10.173.0.33
has Network — DB-Farm WXP32...fse_4025

Service Time > Inventory | Service Time Tier 1 Critical High) > Details (Virtual Machine WXP32bit_fse_4025)

◢ Properties

Name: WXP32bit_fse_4025
VM Name: WXP32bit_fse_4025
Type: Template VM
Operating System: Microsoft Windows XP Professional (32-bit) [Unconfirmed]
Version:
Patch Version:
CPUs: Intel(R) Xenon(R) CPU x3363 @ 2.83GHz
State: Online
Price: $750.00
Tags: 0

Applications: 5 ～ 84
Customers: 1
Kernel Modules/Drivers: 161
Network Configuration: 2
Resource Allocation: 3
Services: 91
Snapshots: 0

◢ Relationships

Baseline: Approved DEV-QA
Cluster: VSphereCluster
Host: 10.173.0.33
Service Tier: Tier 1

◢ Security

Groups: 14
Users: 2

Applications ◢✗

| Name ▲ | Group |
|---|---|
| guildFTPd FTP Deamon | guildFTPd FTP Deamon |
| Java(TM) 6 Update 13 | Java(TM) 6 Update 13 |
| NNE 5.00 | NNE 5.00 |
| Security Update for Windows Server 2003 (KB971557) | Security Update for Windows Server 2003 (KB |
| Windows Server 2003 Service Pack 2 | Windows Server 2003 Service Pack 2 |

INDICATING AN IMPACT OF A CHANGE IN STATE OF A NODE

RELATED APPLICATIONS

This application is related to co-pending application: U.S. patent application Ser. No. 11/867,456, filed on Oct. 4, 2007, titled "Method and system for collaboration involving enterprise nodes".

This application further relates to U.S. patent application Ser. No. 12/905,565, titled "System and method for identification of business process application service groups"; U.S. patent application Ser. No. 12/905,645, titled "System and method for migration of network entities to a cloud infrastructure"; U.S. patent application Ser. No. 12/905,688, titled "System and method for monitoring system performance changes based on configuration modification"; U.S. patent application Ser. No. 12/905,850, titled "System and method for enterprise nodes that are contained within a public cloud to communicate with private enterprise infrastructure dependencies"; and U.S. patent application Ser. No. 12/905,879, titled "System and method for determination of the root cause of an overall failure of a business application service".

The entire contents of each of the above mentioned applications are specifically incorporated herein by reference.

TECHNICAL FIELD

Embodiments of the invention relate generally to network traffic analysis and, in particular, to methods and apparatus for automatic and dynamic updating of an ontological description of a communications network.

BACKGROUND

Many communications networks, such as virtual private networks or other types of enterprise Information Technology (IT) infrastructure environments, for example, are administered by IT professionals (system administrators) who are responsible for secure and efficient functioning of the IT infrastructure. Conventional network management tools fail to provide a system administrator with a real-time understanding of how components making up the network are behaving and interacting operationally. For example, conventional tools permit network traffic analysis based only on static topologies and architecture diagrams that are based on how a network was designed and constructed. Thus, they fail to permit adequate analysis of dynamically changing communicative relations over the network.

Modern networks may be exceedingly complex and dynamic systems, consisting of a variety of entities. For example, entities in an enterprise IT infrastructure environment may include physical and virtual computing machines, arranged at nodes in a communications network, linked by a data transmission medium. The transmission medium could be wired, wireless, or some combination thereof. Various datastores, virtual and physical disks, virtual and physical subnetworks, users, service groups and administrative systems and processes may also constitute parts of the infrastructure environment.

Conventional network management tools and systems can describe logical relationships between enterprise entities, such as, for example, "Enterprise Server A" is linked to "Data Store A". Such tools and systems, however, fail to consider actual observed behavior of an entity (where no prescribed behavior is configured directly) and are inadequate to represent that behavior such that it can be dynamically correlated with monitored state.

As a result, conventional systems fail to enable a system administrator to understand how the IT infrastructure environment is actually being used in terms of both direct and indirect dependencies. For example, known techniques fail to account for indirect degradation of IT infrastructure entities that have a direct result on other IT infrastructure entities where a "communicates with" relationship exists. For example, an enterprise server "A" may appear by all accounts and instrumentation to be working properly, and the direct infrastructure dependencies such as storage and network devices may also be performing properly. But where an indirect dependency exists between two entities (such as an Enterprise Server "B" that enterprise server "A" has an "application communicates with" relationship) and depends on a third enterprise entity (e.g., a data store that the two entities do not share), known techniques fall short. Such indirect dependencies, undetectable by conventional techniques may cause Enterprise Server "B" to incur degraded performance which would cascade to degraded performance of Enterprise Server "A".

Absent knowledge of an indirect degradation of IT infrastructure entities that have a direct result on other IT infrastructure entities where a "communicates with" relationship exists, a system administrator cannot quickly resolve such problems, or efficiently identify and isolate a specific entity or group of entities that may be the catalyst of a network performance issue.

Furthermore, existing techniques fail to take into account how entities are communicating and what impact is/will likely take place as a result in a change in the operational usage. The lack of this knowledge makes it difficult to do effective impact analysis.

BRIEF DESCRIPTION OF THE DRAWINGS

Features of the invention are more fully disclosed in the following detailed description of the invention, reference being had to the accompanying drawings, in which:

FIG. 9 depicts an Impact Summary View for a selected node, according to an embodiment;

FIG. 10 depicts detailed data of the Impact Summary View, according to an embodiment;

DETAILED DESCRIPTION

Figure 1:
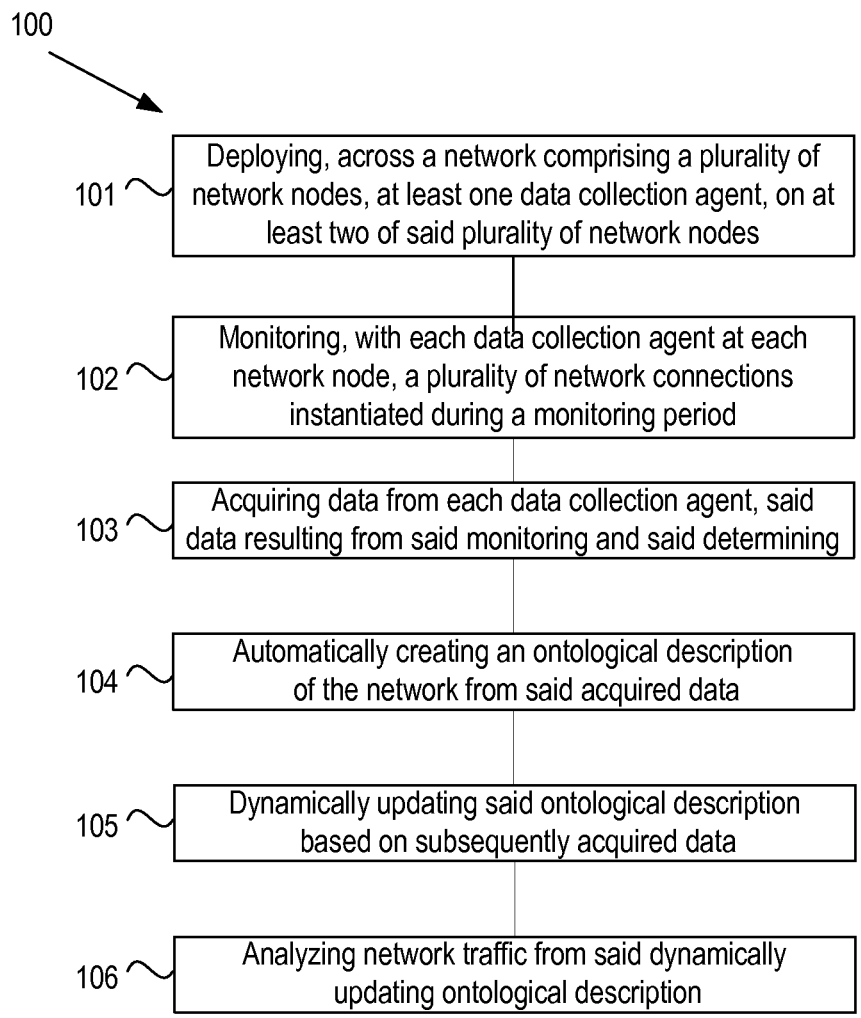
FIG. 1 illustrates a flow diagram of one embodiment of a method for network traffic analysis.

A method and system for determining an effect of a performance of a node of an enterprise network on one or more other nodes of the enterprise network are discussed herein. A primary application may be defined that comprises one or more executables. A network ontology of nodes that communicate during execution of the primary application may be generated and stored in a database. A change of state of one or more of the nodes may be detected. One or more of these nodes may be provided as a query to the database to determine one or more related elements of the network ontology for the primary application that have a changed state. An impact summary view that indicates the elements of the primary application that have changed state may be generated and displayed to a user.

In one embodiment, an indication of the impact of an alert state of a node is provided. Upon receiving an indication of a node that is in an alert state, a network ontology of the indicated node is processed to determine any alert states of related enterprise entities, and an impact summary view is generated to indicate the alert states of the related enterprise entities.

Embodiments of the invention provide the user with the impact that a single node will have on a group of nodes that perform a specific business process, and determine which dependent nodes within a Business Application Service Group will be impacted by a change in "state" by a single node member of the Business Application Service Group.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

In view of the need for improved network traffic analysis capabilities, it is proposed to provide a data collection mechanism (or "agent") that may monitor network connections at a node. Advantageously, the agent may be transparent to the node in which it is inserted. Various embodiments of the data collection agent and an exemplary process for deploying one or more data collection agents are described hereinbelow.

As indicated, a number of agents may be remotely distributed from a single hardware platform to one or more computing nodes within an enterprise network infrastructure. The agents may be installed in stages and each stage may be selected taking into account characteristics of a node (e.g., a node's operating system type and version). An agent at any given mode may be configured to comprise an observation functionality, an analysis functionality, a reporting functionality, and/or some subset of those functionalities.

FIG. 1 illustrates a flow diagram of one embodiment of a method 100 for network traffic analysis. The method 100 is performed by processing logic that may comprise hardware (circuitry, dedicated logic, etc.), software (such as is run on a general purpose computer system or a dedicated machine), or a combination of both.

Advantageously, a network for which traffic analysis is to be performed, may be described in terms of a knowledge base that consists of classes or entities of virtual and physical IT infrastructure, each such entity being referred to hereinafter as a "node" or a "network node". Even when such nodes exist as part of a virtual IT infrastructure, however, they are instantiated on physical IT assets. Ordinarily, although not necessarily, the network will consist of a large number of nodes, interconnected by way of a data transmission medium.

Referring to FIG. 1, at block 101, data collection agents may be deployed, across the network, to observe communication behavior of each node. The agents may be deployed on at least two nodes; advantageously, agents may be deployed on all or a substantial fraction of all the nodes within an enterprise network infrastructure. The agents may be deployed from and/or by a central node that may be a computer platform in communication with the network nodes via the data transmission medium. In some examples, this platform may be referred to as an administration console (AC).

"Deploying" an agent, as the term is used herein, means sending the agent to a node, and inserting the agent within the node so as to enable the agent to access internals of an operating system of the network node. In an embodiment, deploying involves inserting and storing the data collection agent in a network stack of the node's operating system, where the network stack (also known as a protocol stack) contains instructions that implement a set of protocols used to provide communications over the communications network. For example, the AC may propagate the agents out to the various network nodes via the data transmission medium. The AC may propagate the agents in stages so as to first cause a receiving network node to install a core aspect or core engine of the agent when a user of the node logs in. In an embodiment, insertion of the data collection agent is performed such that the agent interfaces with multiple locations of the network stack of the operating system of the network node. Advantageously, the installation may be designed to be transparent to the user and the core engine may be hooked into the stack of the operating system of the node.

Once deployed, the agents, at block 102, may monitor, at each network node, a number of network connections instantiated during a monitoring time period. Monitoring may include, for example, observing electrical signals traveling across the network connections to determine an application source within the node associated with each instantiated network connection. Advantageously, communications of a node with one or more other nodes may be monitored within a kernel of a node's operating system and/or the user space (i.e., the area in virtual memory of a computer that contains user applications that execute at the application layer) so as to resolve the specific applications and processes that are instantiating the connection. The application layer, also known as Application Layer 7 when referencing the Open System Interconnect (OSI) protocol stack, represents the type of communications that occur as a result of a software program running on a physical computing device, often as a direct result of a human action. More specifically, the application layer symbolizes communications emanating from a particular application, such as an email communication, a file transfer, a client/server communication, or the like. As a way of contrasting, this layer does not have any knowledge or operate according to various communication protocols (e.g., packet-based or signal-based) that exist at lower layers.

In an embodiment, the data collection agent collects data about each network connection at the network node. The collected data may be used to identify one or more of network resource utilization, network performance, and network connectivity problems associated with the plurality of network connections. Furthermore, the data collection agent may aggregate data from a number of network connections at the network node. Such data may include, for example, the number of connections, the connection duration, the application making the connection, the systems involved in the connection, connection status, and connection resource usage information. This analysis and identification can involve techniques similar to those used in signals intelligence (or "SIGINT"), where the data can be used to determine what nodes are communicating with or signaling what other nodes, and the frequency and quantity of those communications.

Advantageously, the agent normalizes information collected from the node, with respect, for example, to the type of operating system associated with the node. For example, many operating systems use different nomenclature to represent physical devices addresses and network addresses which identify communication end points. Advantageously, this data may be normalized such that the AC is enabled to accurately map relationships between disparate operating systems correctly.

Data resulting from the foregoing monitoring may be acquired from each agent, block 103. For example the data may be acquired by the AC for processing. Data may be "pushed" by the agent to the AC (i.e, the AC initiates the transmission of the data), or "pulled" by the AC from the agent V. Once acquired by the AC, the data may be stored in physical memory accessible by the AC. Advantageously, data is acquired on an "event-driven" basis such that, for example, data related to instantiation of actual connections (as opposed to connection attempts) is acquired promptly upon occurrence of the instantiation event, rather than on a predetermined, periodic basis. As a result, in accordance with an illustrative embodiment, data relating to a network connection is acquired, and the network connection tracked, in real, or near-real, time.

From the acquired data, an ontological description of the network may be automatically created, block 104. For example, the AC may process acquired data about any particular node's communications activities using an algorithm to determine whether an associated communication relationship meets a preselected threshold of behavior and frequency to be considered a "communicates with" (or "peer to peer") relationship. Such a relationship may be found to exist when, for example, a repetitive pattern of network node (A) instantiating a network level communication with network node (B), and then an application within network node(B) instantiating a network level communication with network node (A) is detected. If for example 4 application instantiations of network communication occur within one hour the AC may classify the two nodes as having a "communicates_with" relationship. In such case, that relationship may be entered into a knowledgebase from which the ontological description may be derived. Additional information may also be received from the enterprise network infrastructure, such as dependency information, and resource utilization data and entered into the knowledgebase.

Alternatively, or in addition, an entity (whether virtual or physical) associated with any node may have a "state" established by, for example, detection of a physical condition of the node at discrete moment in time. The state may be established, for example, on the basis of assigning a threshold, followed by monitoring for any changes to such parameters as CPU usage, memory or storage capacity utilized, network uptime, configuration drift, and/or alerts or alarms from the network. In an embodiment, the data collection agent may include a profile of anticipated application network connections for the network node, and the data collection agent may determine a state of the network node by comparing actual network connections to the profile. The state may be annotated in a visual representation of the ontological description. Moreover, a weighting factor may be applied to the state to facilitate subsequent analysis by the system for alarming and alerting.

The ontological description may depict all or a selected portion of the knowledge base. Advantageously, the knowledge base may consist of a relational database that stores in physical memory all persistent data pertaining network communications traffic. This data may include, but is not limited to, system configuration information, system state information, as well as activity data acquired from the data collection agents. The database may additionally store module activity event configuration, network topology data, node inventory data, operator credentials, and operator activity log data.

Advantageously, the resulting ontological description need not be static. On the contrary, at block 105 the ontological description may be dynamically updated based on subsequently acquired data. The subsequently acquired data may be acquired from one or more agents, or from any other source. For example, a system administrator may update the description, manually or with computer assistance, based on data received from a network user, a vendor, a customer, or a third party. Moreover the system administrator may be enabled to select a baseline ontological description from the dynamically updating ontological description. Following such selection, deviations from the baseline ontological description may be indicated. Advantageously, dynamically updating the ontological description may occur in real time or near-real time. In an embodiment, for example, the inventors have found that the ontological description of the network may be dynamically updated within 50 seconds of a transmission of a message from a data collector for a network having one thousand nodes, of which 10% have experienced a change of state configuration, or relationship.

Figure 5:
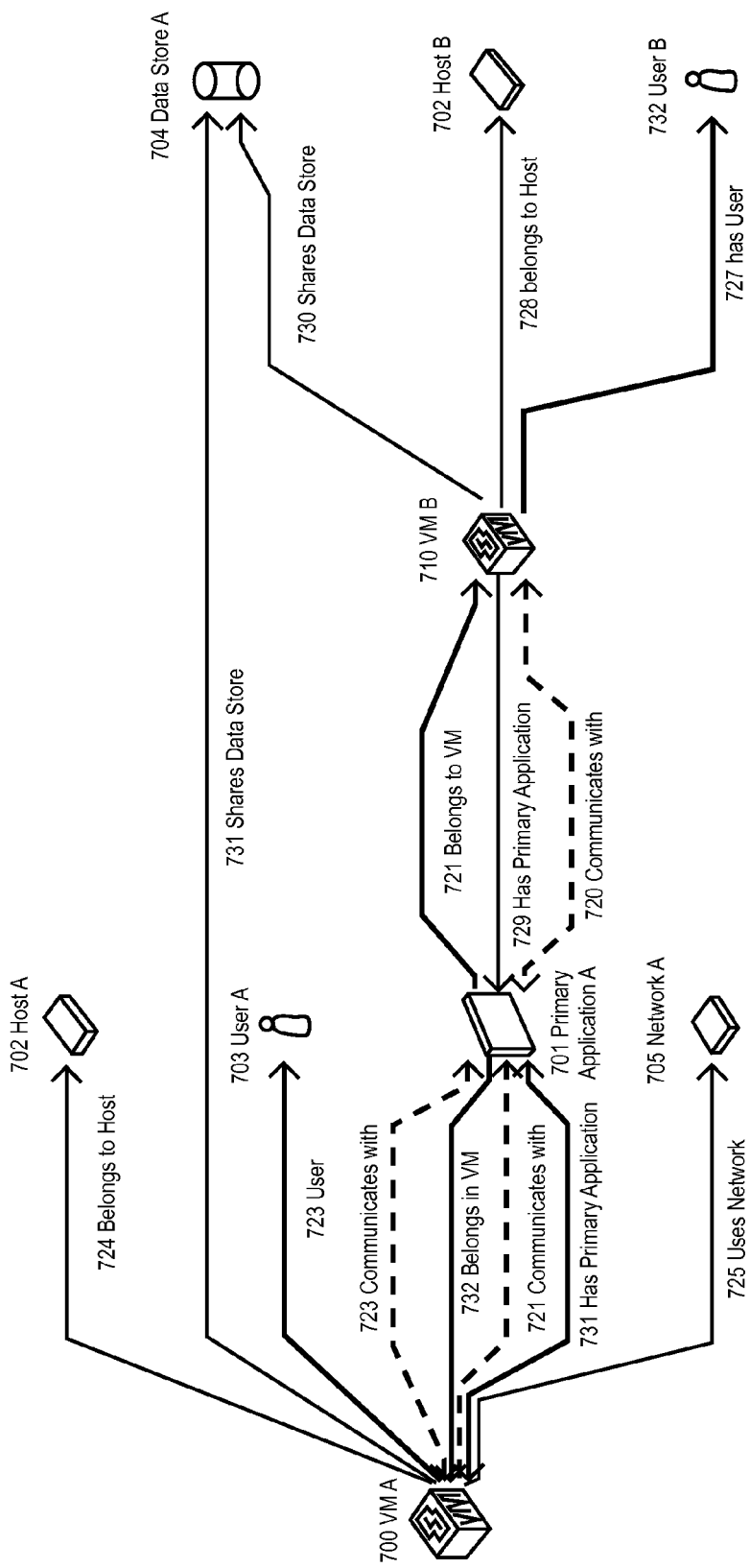
FIG. 5 depicts an illustrative example of a user interface for presenting an ontological description of a network.

Network traffic analysis from the dynamically updating ontological description may then be performed, block 106. The system administrator, for example, may navigate a visual representation (e.g., a directed graphs visualization) of the ontological description to select what relationships or specific entities to analyze. The visual representation, an illustrative example of which is depicted in FIG. 5, may, for example, describe selected entities within the network as well as applications within the entities. In an embodiment, network traffic analysis may include correlative analysis that may be performed in real time. In a further embodiment, network traffic analysis may include identification of one or more applications used to communicate with a network node.

Figure 2:
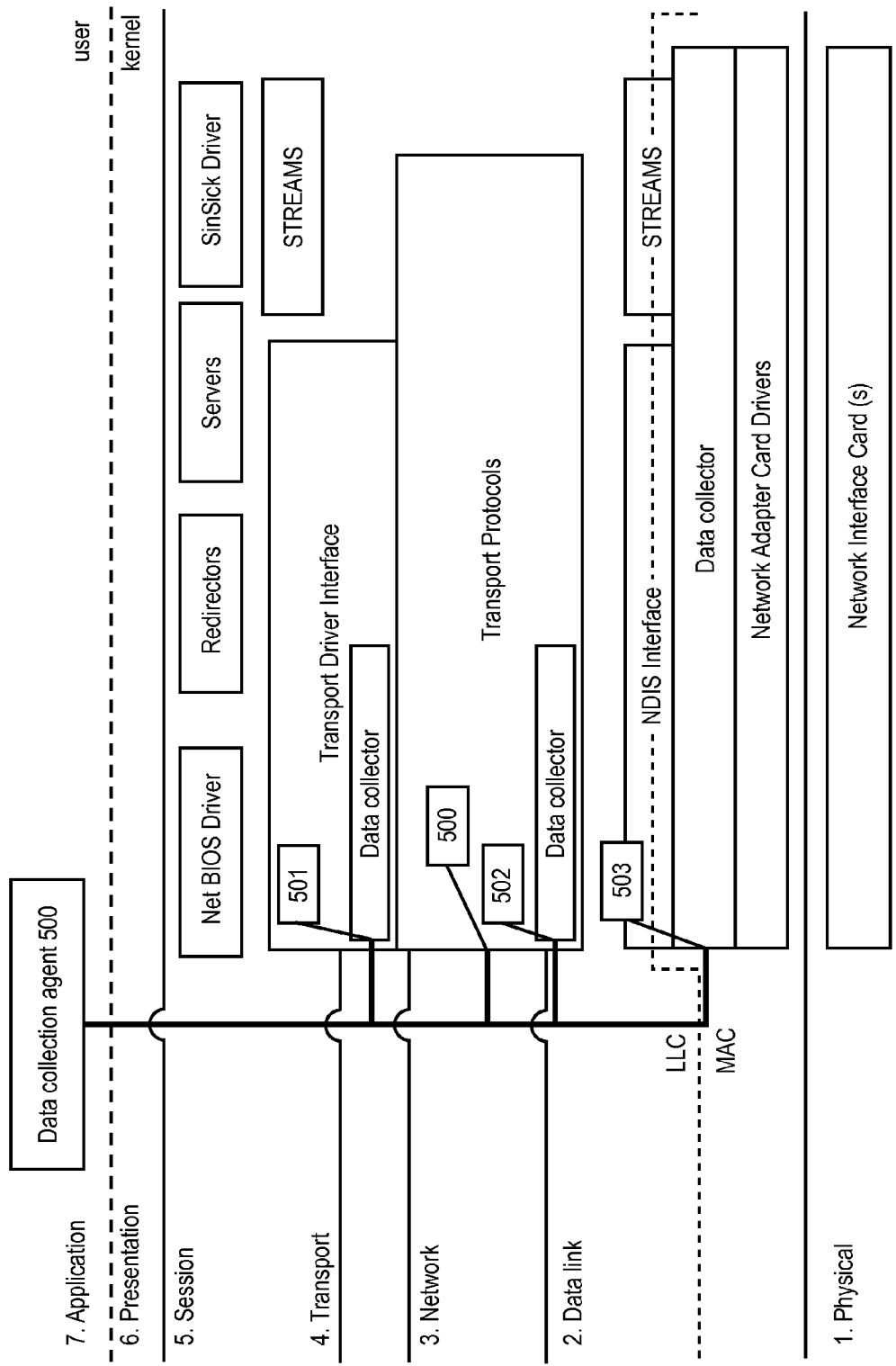
FIG. 2 illustrates insertion of a data collection agent, according to an embodiment.

Thus, a method for network traffic analysis has been disclosed. The foregoing method may be accomplished using appropriate apparati and systems. For example, referring now to FIG. 2, deployment of a data collection agent onto an operating system of a network node will be described in the context of the seven layer OSI model.

A data collection agent may support multiple processes depending on the target operating system and the exact data to be collected. For example, in some embodiments a data collection agent may only require a single hook into the operating system to collect a reasonable set of data. A hook is a point in the operating system where an application can install a subroutine to monitor message traffic over a connection via, for example, a system message-handling mechanism. Advantageously, for most operating systems, multiple hooks may be provided to collect the data required for the ontological description. Advantageously, with reference to the OSI model, a data collection agent may be inserted at the application layer of a network node, and has interfaces at lower layers of the OSI model as well. Data collection agents may interface with a network node in various ways; a few illustrative examples are provided hereinafter.

As an illustrative example, a data collection agent may have an interface 500 to an operating system's network stack and periodically determine what applications are using the network stack. Thereby the data collection agent may track information regarding a network connection, the connection duration, and any applications and systems involved in the connection. Moreover, the data collection agent may normalize the foregoing information and report it to the AC so that different operating systems may be correlated by the AC.

As a further example, the data collection agent may include a network filter inserted into the network stack to determine exactly when a connection is made between entities. The filter component of the data collection agent may be inserted at one or more layers of the OSI model. For example a data collection agent may have filter interface 501 at the transport layer and/or a filter interface 502 at the network layer. Thereby, the data collection agent may track information regarding a network connection, the connection duration, and any applications and systems involved in the connection. Moreover, the data collection agent may normalize the foregoing information and report it to the AC so that different operating systems may be correlated by the AC.

As a yet further example, the data collection agent described in the preceding paragraph may also include a packet filter inserted into the network stack to track connection data. For example, a data collection agent may have filter interface 503 at the data link layer. Then, data collection agent 500 may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the AC so that different operating systems may be correlated by the AC.

Figure 3:
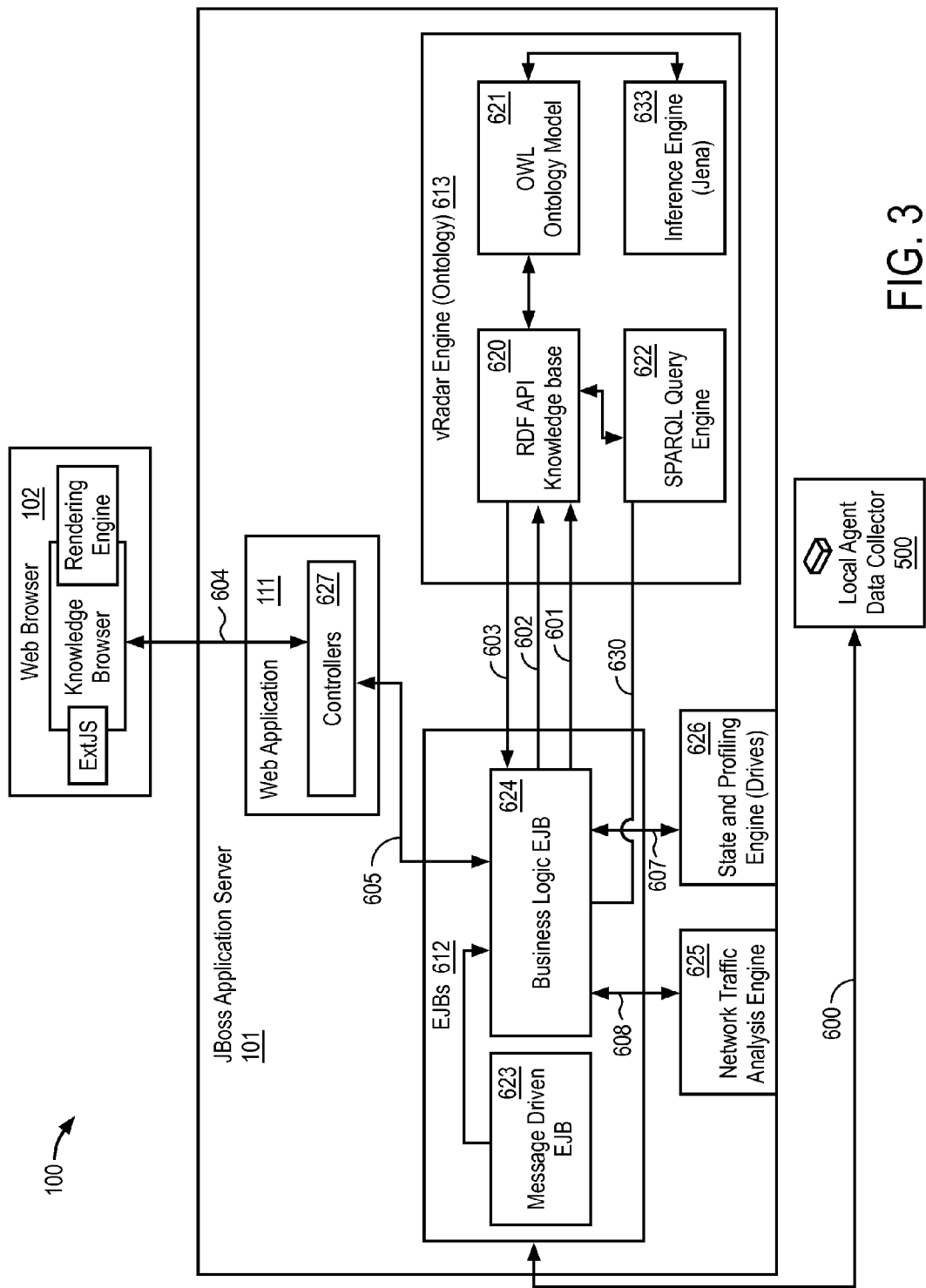
FIG. 3 depicts an illustrative embodiment of a system for creating and updating an ontological description of a network.

Referring now to FIG. 3, an illustrative system 100 for deploying data collection agents onto network nodes, monitoring network connections instantiated at each network node, acquiring resulting data, automatically creating an ontological description of the network from the acquired data; and dynamically updating the ontological description will be described. In an embodiment, elements of system 100 utilize the Java software platform and Enterprise Java Bean (EJB) architecture to provide certain functionality, and these well-known terms may be used in the description that follows. Other software platforms and architectures, providing similar functionality may be used without departing from the scope of the present invention.

System 100 may consist of an application server 101, which interacts across a network with a number of data collection agents 500. Advantageously, application server 101, may be an element of an administrative console (AC) that also provides a suite of network management tools. A system administrator may perform network traffic analysis and/or other network management tasks by accessing application server 101 by way of web browser 102. Application server 101 may consist of an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may consist of data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, determined by Ontology Web Language (OWL) API 621.

Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with" relationship exists. A determination may be made by tracking the number of connections of a specific application over a period of time. The period of time may be preselected, for example, by the system administrator.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by OWL API 621. For example OWL API 621 may define what entity classes exist, their possible relationship to each other, and their possible state.

Figure 4:
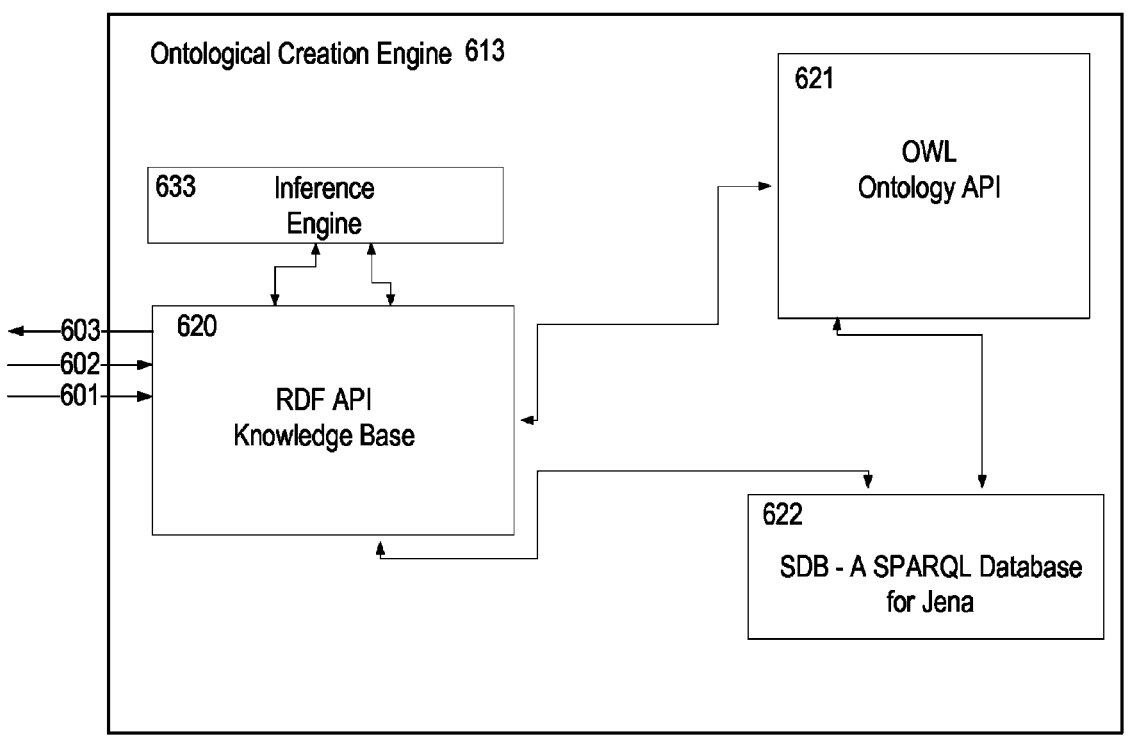
FIG. 4 illustrates a detail of ontological creation engine, according to an embodiment.

Referring now to FIG. 4, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL Database for Jena 622 for later inference processing by inference engine 623. Inference engine 623 may determine inferred relationships based on the ontology model contained in OWL Ontology API 621.

In an embodiment, a visualization of network state and communication activity may be provided, whereby the system administrator is provided with a visual rendering (e.g., on a computer monitor) of the knowledge base as illustrated in FIG. 5. The visualization may be filtered to any selected entity of interest. For example, referring again to FIG. 3, the system administrator or other user may use a web browser 102 to request rendering of data via web application 111 from controllers 627. Controllers 627 may pass along any filtering information such as a specific Host Id. Next, business logic EJB 624 may be called by the controllers. Business logic EJB 624 may query RDF API knowledge base 620 for requested data. The requested data may be returned through controllers 627 to the web browser. The requested data may then be converted into a directed graph by a rendering engine.

In FIG. 5, for example, a rendering of Virtual Machine (VM) A 700, according to at least some of the embodiments of the present invention, illustrates that Virtual Machine (VM) A 700 has infrastructure dependencies of Network A 705, Data Store A 704, User A 703, Host A 702, and a Primary Application A 701. VM A 700 has a "communicates_with" relationship with VM B 710. VM A 700 may be presented as being in a "red" state as a result of having an associated alert set or having a specified parameter exceed a defined threshold. In addition, Data Store A 704 and Host A 702, which are used by VM A 700 may be presented as being in a "yellow state". The system administrator, thereby, is enabled to analyze the potential impact and cause of the resulting state of VM A 700.

The visualization shows that the "communicates_with" relationship between VM A 700 and VM B 710 is constrained by Primary Application A 701. The visualization also makes clear that VM A 700 and VM B 710 share data store A 704.

The system administrator may inspect any entity in the visualization. Then an impact summary may be generated, consisting, for example, of current and historic information derived from processed messages received from the data collection agents. This information may be correlated to provide the system administrator with an overall impact assessment of the dependent entities in the infrastructure that may be automatically and dynamically updated in near real time.

The impact summary is dependent on the state of the nodes that make up a service group. Any node may have a "state" established by, for example, detection of a physical condition of the node at discrete moment in time. The state may be established, for example, on the basis of assigning a threshold to such parameters as CPU usage, memory or storage capacity utilized, network uptime and then monitoring for any changes to such parameters to determine if the threshold conditions are met. State may also be defined by monitoring for configuration drift, and/or alerts or alarms from the network. In an embodiment, the data collection agent may include a profile of anticipated application network connections for the network node, and the data collection agent may determine a state of the network node by comparing actual network connections to the profile.

The state may be annotated in a visual representation of the ontological description. Moreover, a weighting factor may be applied to the state to facilitate subsequent analysis by the system for alarming and alerting.

The ontological description may depict all or a selected portion of the knowledge base. Advantageously, the knowledge base may consist of a relational database that stores in physical memory all persistent data pertaining to network communications traffic. This data may include, but is not limited to, system configuration information, system state information, as well as activity data acquired from the data collection agents. The database may additionally store module activity event configuration, network topology data, node inventory data, operator credentials, and operator activity log data.

The Agent will automatically determine what applications and services are being executed within a node and to where they are communicating within the Infrastructure. The group of nodes having a communication relationship forms a service group and the user may allocate the service group a "Primary application" name which is used by the system in the Impact Summary view to be described below.

The user can initiate an agent function to further define a Business Application Service process. This process is accomplished by the user selecting the agent function for tracking a session in the web browser. The agent sends a message that listens for an initiation of network activity that is observed by the executables communicating with the other members of the Service Group. These members make up the primary application for the Business application service group. Once the communication has ceased and is verified by the user, through the web browser, to have completed successfully, the Business application process cycle is recorded in the database as a Specific Business Process Cycle. Service Groups that perform Business Application Processes that have been categorized by a user may be identified within the network ontology.

Figure 6:
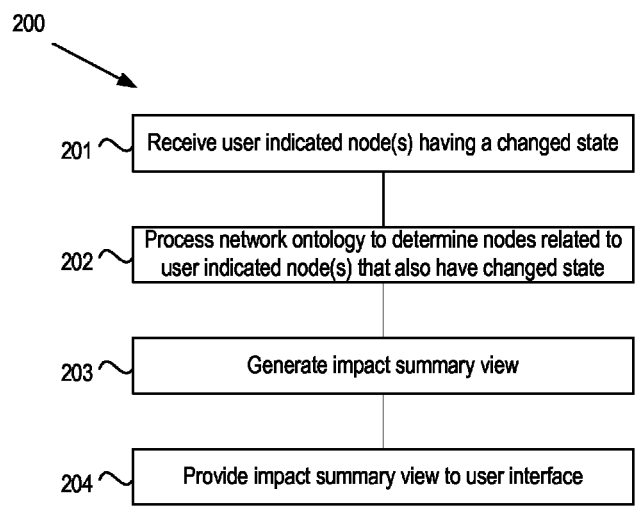
FIG. 6 depicts a flow diagram of one embodiment for a method of indicating the impact of a node state on other entities of the enterprise network.

One embodiment of a method for indicating the impact of a changed state of a node of an enterprise network is depicted in FIG. 6. The method of FIG. 6 is performed by processing logic that may comprise hardware (circuitry, dedicated logic, etc.), software (such as is run on a general purpose computer system or a dedicated machine), or a combination of both.

Referring to FIG. 6, at block 201, a user selection of a node that has been reported to have changed state via the Administrative Console interface Inventory view is received. Nodes that will be of particular importance will be those nodes that are now indicated to be in an alert state. The Web browser, via the Administrative Console interface Inventory view receives the request and processes the network ontology for a given node to determine any related enterprise entities (block 202) that also include a changed state, including other network nodes, applications, service groups, etc. In one embodiment, related entities that are now in an alert state are determined, whether or not the indicated node is in an alert state. At block 203, an RDF engine (described further below) uses the state information for the node's network ontology to generate an impact summary view that indicates the states of the related enterprise entities. The impact summary view may then be displayed to the user through the web interface 111 (block 204)

A specific example for generating an impact summary will now be described with reference to FIGS. 7 to 11. When an agent first starts acquiring data, inventory, configuration and events messages are sent from the Agent 500 to the Message Driven EJB 623 as shown in FIG. 6. The data is received by a master agent 41 and forwarded to the I/O Processor 42 for routing to the JMS Queue 43 of the Business Logic EJB 624. Once routed an appropriate Entity Java Bean (EJB) is created in the EJB Message Driven engine 46 for the agent message. Entity Java Beans (EJB) are created for the Inventory, Configuration, and event messages separately. A notification is sent to the Real-time bus 47 once the EJB Message Driven Bean engine 46 has created the entity bean. At the same time, notification is sent to the RDF (Resource Definition Frame Work) engine 620 and the OWL (Ontological Web Language) File is updated.

The agent continues to periodically report the node inventory, configuration and events in subsequent messages which creates further beans at the EJB Message driven engine 46.

Entity beans are sent to the Database 48 as Configuration tables via an object-relational mapping (ORM) library 49 such as Hibernate or Toplink. For example, Hibernate provides a framework for mapping an object-oriented domain model to a traditional relational database and controls object-relational impedance mismatch problems by replacing direct persistence-related database accesses with high-level object handling functions.

Figure 7:
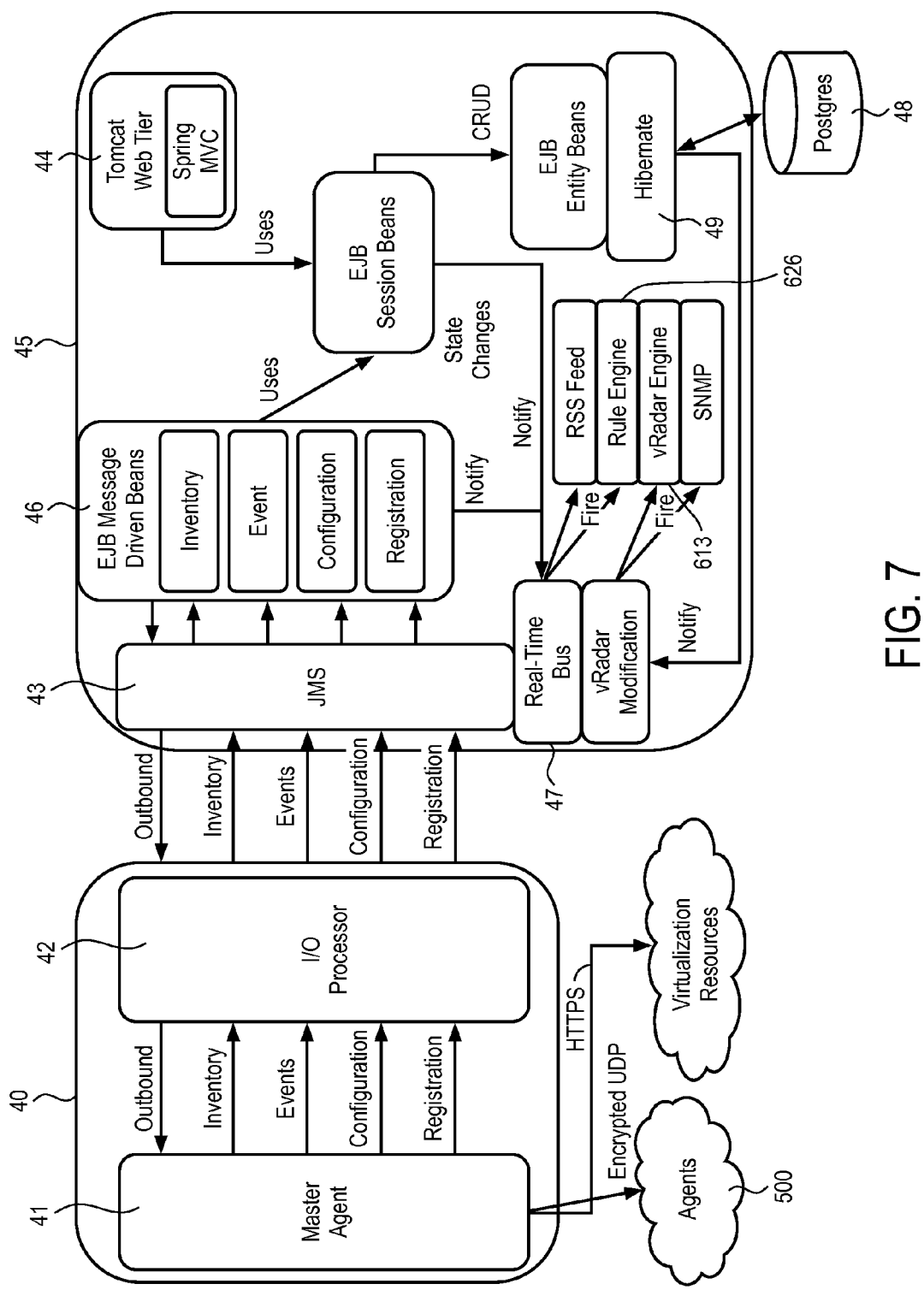
FIG. 7 depicts an illustrative embodiment of an administration module for an enterprise network.
Figure 8:
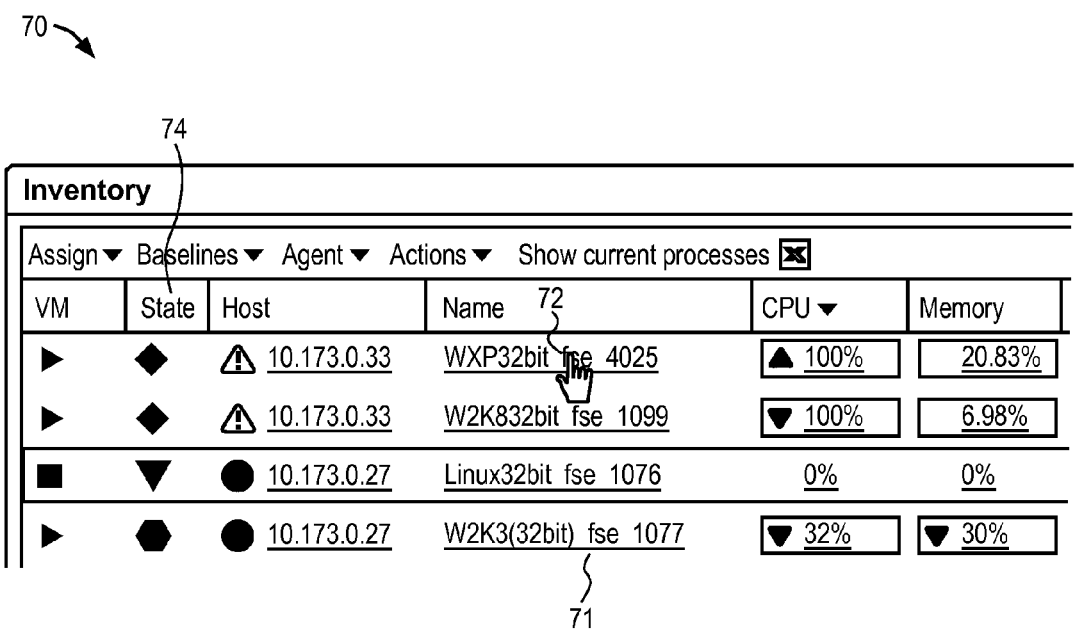
FIG. 8 depicts an Inventory interface, according to an embodiment.

The web application 111 may be configured to provide an inventory view to the web browser 102. An example inventory view 70 is shown in FIG. 8. The inventory view 70 may provide a list 71 of available nodes as well as related data for that node, such as a state 74. The inventory view 70 may be ranked by state, as shown in FIG. 7, so that nodes that have an high alert level are listed at the top. Selecting a node ID, e.g. virtual machine WXP32bit_fse_4025 72, creates a summary view for that node. An example summary view 80 is shown in FIG. 9. In one embodiment, the summary view 80 is generated when the user selects a node ID by first sending the node ID in a query to the database 48. The query returns data relating to the node ID. The impact summary view is then generated by the web application 111 from the returned query data.

In one embodiment, the query returns any related applications and nodes that have been placed into an alert state. For example, the query may return nodes and applications having a Service Tier threshold change that is Red (Error), or an Infrastructure status condition warning, or a Communication severed message. These state messages may be returned by the rules engine 626. The user is thus able to view the impact that a changed state of a particular node has had on other nodes of the enterprise network, particularly when that node enters an alert state. Using this view, the user is able to determine whether the changed state is critical or not. A critical change state will be a state where the business applications are no longer able to function adequately whereas a less critical alert state will have had minimal impact on other applications and nodes.

An example of a summary view 80 for the node 72 is illustrated in FIG. 9. The virtual machine summary 80 indicates the configuration 81 of the VM, properties 82, and relationships 83 such as an assigned baseline, cluster, host and service tier. Each of the elements may be summarized by a hyperlink that, when selected, provides more detailed data. For example, selecting the number of applications hyperlink 84 of the configuration menu 81 opens a table 91 listing all applications executed by the VM at the bottom of the page, as depicted in FIG. 10.

The impact summary 85 for the virtual machine 72 is indicated in the virtual machine summary 80. The impact summary 85 indicates the current CPU and Memory status 86 as well as any alert messages 87. In the current example, the CPU is indicated to be critical at 100% usage while the memory is indicated to be operating within normal parameters. The impact summary also indicates any dependent nodes 88 and any affected applications 89. In this example, the affected applications are listed as "SQL", "SAP" and "EXCHANGE". The affected nodes include storage and network devices.

The Impact summary view 80 enables the user to monitor, interpret, and maintain the state of the virtual service relationships between applications, virtual machines and their users, hosts, storage and network resources. The impact summary view 80 provides the user with any impacted nodes that result in a change in state of any single member node. The user is provided "Impacted dependencies", "Application Owners", Primary Applications affected". Hyperlinks are provided on all views to provide the user with the ability to drill further into the data to view details. In one embodiment, a root cause process may be initiated to determine the root cause of a change in state. Further details of the root cause process are described in the Applicant's co-pending patent application titled "System and method for determination of the root cause of an overall failure of a Business Application Service", referenced above.

The user may use navigational controls, such as pan and zoom to explore the various relationships between the elements. The user may also select from layouts that best display the type of data points including balloon, circular, hierarchical (left to right, top down), organic, and orthogonal. State may be reflected in the ontological view in the color of both relationship connectors and objects.

One embodiment of a method for generating the Impact Summary view 80 will now be described with reference to FIG. 11. The method of FIG. 11 is performed by processing logic that may comprise hardware (circuitry, dedicated logic, etc.), software (such as is run on a general purpose computer system or a dedicated machine), or a combination of both.

Figure 11:
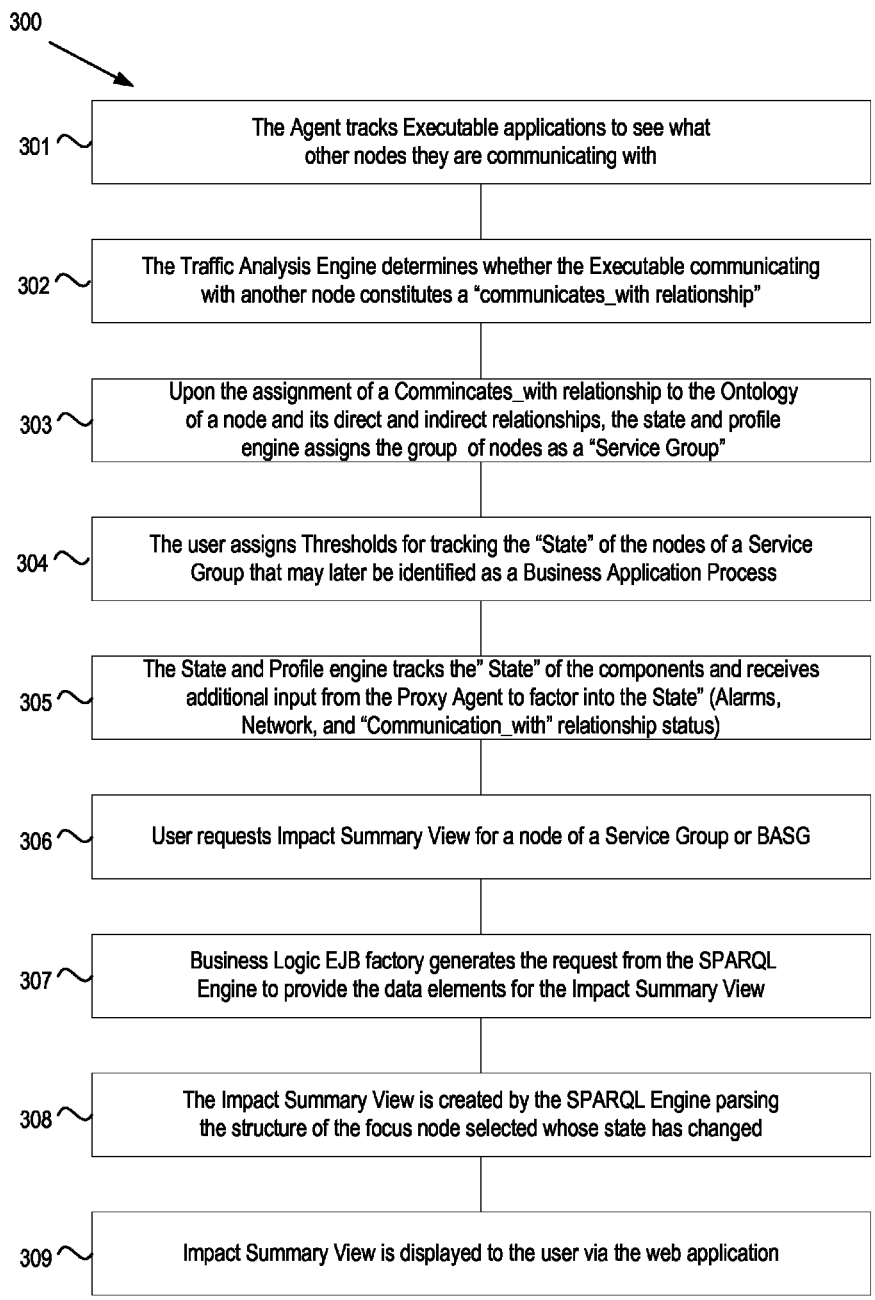
FIG. 11 depicts a flow diagram of one embodiment of a method for generating the Impact Summary View.

Referring to FIG. 11, at block 301, the agents deployed to the enterprise nodes track the executable applications on the respective nodes to see what other nodes they are communicating with. The agent data is reported to the traffic analysis engine 625, via the master agent 41, which determines whether the executable communicating with another node constitutes a "communicates_with" relationship (block 302), thereby defining a service group. Upon the assignment of a communicates_with relationship to the Ontology of a node and its direct and indirect relationships, the state and profile engine assigns the group of nodes as a "Service Group" (block 303). The user may use the Service groups as the basis for defining Business Application Service Groups, as described above. The user assigns thresholds for tracking the "State" of the nodes that make up the components of the service group (block 304). The State and Profile engine tracks the state of the components and receives additional input from the Agent to factor into the "State" (Alarms, Network, and "communication_with" relationship status) (block 305). At this point, the RDF Knowledge Base contains an Ontology for each individual node, as well as each Service Group and, if defined, each Business Application Service Group. The model and structure the system uses to create and update the knowledge base is contained within a Web Ontology Language (OWL) file present on the application server. OWL is a family of knowledge representation languages for authoring ontologies which are a formal representation of the knowledge by a set of concepts within a domain and the relationships between those concepts. Ontologies are used to reason about the properties of that domain, and may be used to describe the domain. The Ontology provides the direct and indirect dependency information the SPARQL Engine requires to infer the impact a change in "state" will have on the rest of a Service Group or BASG.

At block 306, a user request for an impact summary view is received when a user clicks on a node that is the member of a Service Group. In response to the user request, the Business Logic EJB 624 sends a request to the SPARQL engine 622 for the components of the Impact Summary view that relate to the selected node (block 307). The Impact Summary View is created by the SPARQL Engine parsing the structure of the focus node selected by the user (block 308). At block 309, the impact summary view is displayed to the user, via the web application 111. The Impact Summary View contains the direct and indirect Service Group and BASG nodes that will be impacted, Primary Applications that rely on these nodes, the executables affected, as well as the actual state of all the nodes involved. The Impact Summary View may also provide how the performance of the nodes involved are trending with indicators such as up, unchanged, or down.

Figure 12:
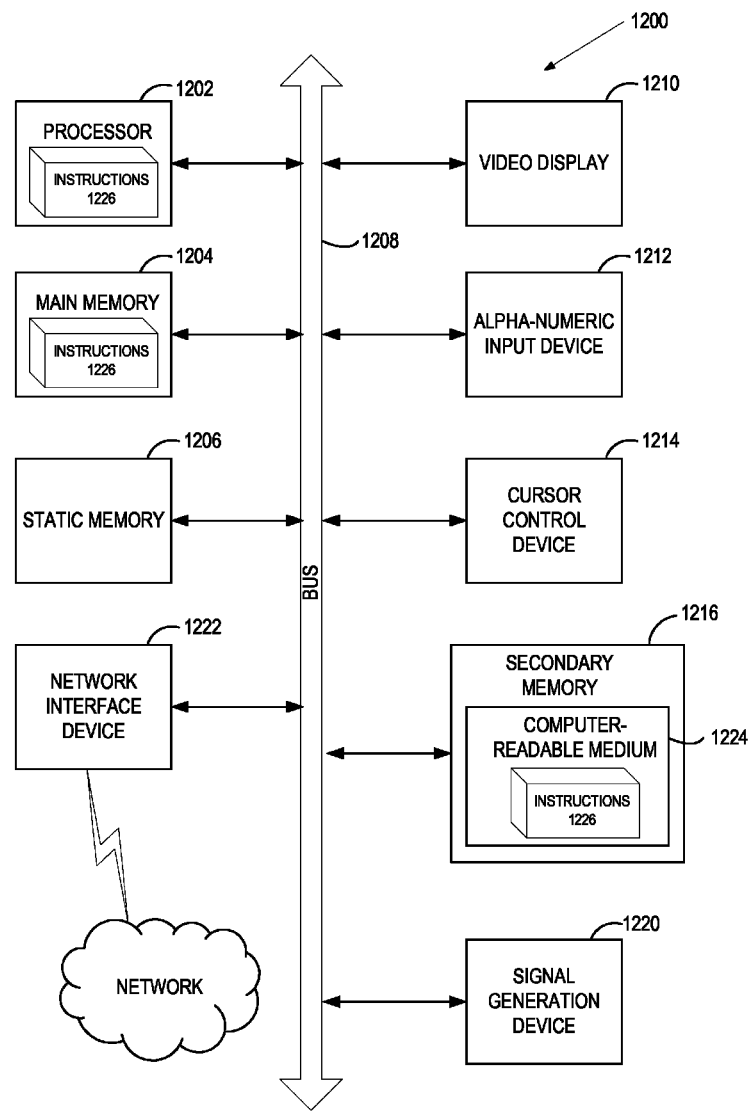
FIG. 12 is a block diagram of an exemplary computer system that may perform one or more of the operations described herein.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1216 (e.g., a data storage device), which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 1202 is configured to execute instructions 1226 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The secondary memory 1216 may include a machine-readable storage medium (or more specifically a computer-readable storage medium) 1224 on which is stored one or more sets of instructions 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

The machine-readable storage medium 1224 may also be used to store software performing the operations discussed herein, and/or a software library containing methods that call this software. While the machine-readable storage medium 1224 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   defining, by a processing device, a primary application comprising an executable;
   determining, by the processing device, a network ontology for the primary application, the network ontology comprising a plurality of nodes of an enterprise network that communicate to execute the executable;
   storing the network ontology in a database;
   detecting, by the processing device, a changed state for a first node of the plurality of nodes;
   determining, based on the changed state, a second node of the plurality of nodes of the network ontology for the primary application that has a related changed state;
   generating, by the processing device, an impact summary view that indicates the second node of the plurality of nodes of the primary application that has the related changed state; and
   displaying the impact summary view to a user.

2. The method of claim 1 further comprising defining one or more thresholds for one or more states of the primary application.

3. The method of claim 1 further comprising monitoring one or more states of the primary application.

4. The method of claim 1 wherein determining the network ontology for the primary application comprises determining the plurality of nodes that have a communication relationship during execution of the executable.

5. The method of claim 4 wherein determining the plurality of nodes that the communication relationship during execution of the comprises:
   receiving data from a plurality of software agents deployed to the plurality of nodes, the data indicating a source-to-destination connection of the executable executing on the plurality of nodes; and
   processing the data received from the plurality of software agents to determine the communication relationship between the plurality of nodes.

6. The method of claim 1 wherein the impact summary view indicates an alert state of the primary application.

7. The method of claim 1 further comprising depicting the network ontology on the impact summary view, the depiction of the network ontology indicating a state of connections between the plurality of nodes.

8. The method of claim 1 further comprising:
   receiving a selection of the first node that is in an alert state from the user through a user interface;
   generating the impact summary view in respect of the first node in response to receiving the selection from the user.

9. A method comprising:
   receiving, by a processing device, an indication of a node that is in an alert state;
   processing, by the processing device, a network ontology of the indicated node to determine an alert state of a related node, wherein the related node comprises an application that at least partially executes on the indicated node;
   generating, by the processing device, an impact summary view that indicates the alert state of the related node; and
   displaying the impact summary view to a user.

10. The method of claim 9 wherein the related node has a communication relationship with the indicated node during the execution of the application.

11. The method of claim 9 further comprising generating the network ontology for the indicated node comprising:
    receiving data from a plurality of software agents deployed to a plurality of other nodes, the data indicating a source-to-destination connection of the application executing on the plurality of other nodes; and
    processing the data received from the plurality of software agents to determine the communication relationship between the plurality of other nodes.

12. The method of claim 9 wherein the impact summary view indicates the application that is in the alert state.

13. The method of claim 9 further comprising depicting the network ontology on the impact summary view, the depiction of the network ontology indicating a state of connections between a plurality of nodes of the network ontology.

14. A system comprising:
    a memory;
    a processor, coupled to the memory; and
    an administration module, executed from the memory by the processor, to:
    receive an indication of a node of an enterprise network that is in an alert state from a user through a user interface;
    process a network ontology of the indicated node to determine any alert state of a related node, wherein the related node comprises an application that at least partially executed by the indicated node;
    generate an impact summary view that indicates the alert state of the related node; and
    display the impact summary view to the user via the user interface.

15. The system of claim 14 further comprising:
    a knowledge base module that stores an ontological description of the enterprise network; and
    a query engine to provide a query to the knowledge base module, the query indicating one or more other nodes of the enterprise network that are in the alert state.

16. The system of claim 15, the knowledge base to return a query response that indicates the one or more other nodes in the same network ontology as the indicated node in the alert state.

17. The system of claim 15, the knowledge base to return a query response that indicates a primary application at least partially executed by the indicated node in the alert state.

18. The system of claim 14, the administration console to provide an interface that allows the user to indicate a primary application of a business application service group, the system comprising a traffic analysis module that generates an ontological description for the primary application comprising a plurality of nodes of the enterprise network that communicate with each other during execution of the primary application.

19. The system of claim 14 wherein the impact summary view depicts the network ontology for the indicated node, the depiction of the network ontology indicating a state of connections between a plurality of nodes of the network ontology.

20. A non-transitory computer readable medium including instructions that, when executed by a processing device, cause the processing device to perform operations comprising:
- defining a primary application comprising an executable;
- determining network ontology for the primary application, the network ontology comprising a plurality of nodes of an enterprise network that communicate to execute the executable;
- storing the network ontology in a database;
- detecting a changed state for a first node of the plurality of nodes;
- determining, based on the changed state, the changed state to determine a second node of the plurality of nodes of the network ontology for the primary application that has a related changed state;
- generating an impact summary view that indicates the second node of the plurality of nodes of the primary application that has the related changed state; and
- displaying the impact summary view to a user.

* * * * *